United States Patent [19]
Gosser
[11] 3,927,056
[45] Dec. 16, 1975

[54] HYDRIDO(NITRILE)TRIS(TRIARYL PHOSPHITE)COBALT COMPLEXES

[75] Inventor: Lawrence Wayne Gosser, Wilmington, Del.

[73] Assignee: E. I. Du Pont de Nemours & Company, Wilmington, Del.

[22] Filed: Apr. 4, 1974

[21] Appl. No.: 457,913

[52] U.S. Cl. ..... 260/439 R; 252/431 N; 252/431 P; 260/677 H; 260/683.15 D
[51] Int. Cl.[2] .......... C07F 15/06
[58] Field of Search .......... 260/439 R

[56] References Cited

UNITED STATES PATENTS

| | | | |
|---|---|---|---|
| 3,453,302 | 7/1969 | Pregaglia et al. | 260/439 R |
| 3,481,961 | 12/1969 | Pregaglia et al. | 260/439 R |
| 3,631,191 | 12/1971 | Kane et al. | 260/439 R |
| 3,678,085 | 7/1972 | Rick et al. | 260/439 R X |
| 3,766,231 | 10/1973 | Gosser et al. | 260/439 R |
| 3,775,461 | 11/1973 | Drinkard et al. | 260/465.3 |

OTHER PUBLICATIONS

Tyrlik, J. Organometallic Chemistry, V. 39, pp. 371–379, (1972).
Otsuka et al., J. Chem. Soc., 1968A, pp. 2630–2633.
Otsuka et al., J. Chem. Soc. 1969A, pp. 497–500.
Rossi et al., Chem. Comm. p. 471, (1969).
Misono et al., Chem. Com. p. 208, (1969).

*Primary Examiner*—Helen M. S. Sneed

[57] ABSTRACT

Novel cobalt monohydride complexes with triaryl phosphites and organonitriles, e.g., hydridoacetonitriletris(tri-o-tolyl phosphite)cobalt, formed by reducing π-cyclooctenyl-π-cycloocta-1,5-diene cobalt with hydrogen in the presence of the triphenyl phosphite and the organonitrile, are useful as hydrogenation catalysts.

8 Claims, No Drawings

HYDRIDO(NITRILE)TRIS(TRIARYL PHOSPHITE)COBALT COMPLEXES

BACKGROUND OF THE INVENTION

1. Field of the Invention

This invention relates to, and has as its principal object provision of, novel monohydrido cobalt organonitrile triaryl phosphite complexes useful as hydrogenation catalysts.

2. Prior Art

There are known to be hydride complexes of uninegative cobalt of formula $HCoL_3N_2$ and $HCoL_4$ where L represents certain tertiary phosphines or phosphites. The latter series including $HCo[P(OC_6H_5)_3]_4$ is readily prepared by reducing a cobalt salt in the presence of triphenyl phosphite and is a recommended starting material for preparing the $Co^{+1}$ hydrocyanation catalyst disclosed in a series of patents to Drinkard et al. (e.g., U.S. Pat. No. 3,775,461) of common assignment with this application.

Evidence is given by Rossi and Sacco (Chemical Communications 1969, 471) for equilibria among $N_2$, $H_2$ and the fourth L group available for coordination about the $HCoL_3$ moiety.

Misono et al. (Chemical Communications 1969, 208) have disclosed that the nitrogen-bearing complexes with triphenyl phosphine appear to react with certain organonitriles to form complexes $HCo(RCN)[P(C_6H_5)_3]_3$.

The present invention provides a new series of cobalt hydride complexes having organonitrile and triaryl phosphite ligands. These new compounds as a result of their particular ligand groupings catalyse the hydrogenation of olefins much more actively and more selectively than do the related prior art compositions.

SUMMARY AND DETAILS OF THE INVENTION

The compounds of this invention are cobalt monohydride organonitrile triaryl phosphite complexes for which may be written the general formula $HCo[R(CN)_x][P(OAr)_3]_3$, wherein: $x$ is 1 or 2; when $x$ is 1, R is alkyl, alkenyl, aryl or alkaryl of up to 18 carbons; when $x$ is 2, R is alkylene, alkenylene, arylene or alkarylene of up to 18 carbons; and the Ar's, which may be different, are phenyl or alkylphenyl of up to 18 carbons.

The present compounds are prepared in liquid solution by reducing $\pi$-cyclooctenyl-$\pi$-cycloocta-1,5-diene cobalt with hydrogen in the presence of at least one triaryl phosphite and at least one organonitrile. Usually the lastmentioned will be employed as the reaction solvent. Reaction conditions and the proportion of reactants are not critical, e.g., ambient temperatures of 10°–80°C and hydrogen pressures up to 5 atmospheres can conveniently be employed.

The preparation of the starting material $\pi$-cyclooctenyl-$\pi$-cycloocta-1,5-diene cobalt, $Co(C_8H_{13})(C_8H_{12})$, is described by Otsuka and Rossi in J. Chem. Soc. 1968A, 2630. This material can be reduced by hydrogen in the presence of a stoichiometric quantity of the appropriate triaryl phosphite and an excess of the desired organonitrile.

A wide range of aliphatic or aromatic nitriles $R(CN)_x$ may be directly employed where R is an aliphatic or aryl group of up to 18 carbons. The groups may be straightchained, branched, saturated or unsaturated or divalent and attached to more than one nitrile group. Typical of the many useful classes of nitriles are acetonitrile, acrylonitrile, pivalonitrile, cyclohexylcyanide, benzyl cyanide, benzonitrile, adiponitrile and terephthalonitrile. It may be convenient to form some of the nitrile complexes by interchange of one nitrile from complexes with other nitriles. The exchange of nitriles is shown for example by changes in the nmr spectra when acetonitrile complex is added to an excess of deuteroacetonitrile. Similarly the characteristic absorption of an organonitrile in the infrared is shifted to higher frequency upon coordination to the central Co ion. Thus if an acetonitrile complex is added to an excess of another nitrile, RCN (e.g. $R = C_6H_5$), the ir band at around 2,280 $cm^{-1}$ due to cobalt coordinated $CH_3CN$ shifts to a band at about 2,255 $cm^{-1}$ characteristic of uncoordinated $CH_3CN$, and the absorption characteristic of free RCN shifts to higher frequency. The acetonitrile may be removed by evaporation for example to produce a complex containing benzonitrile as a ligand.

A considerable variety of triaryl phosphites may be coordinated to Co in the complexes without losing the catalytic acitvity characterizing this invention. The various tolyl and xylyl phosphites are effective, as are the triphenyl phosphites bearing branched substituents such as isopropyl and t-butyl groups. It will be recognized by those familiar with coordination chemistry that steric limitations may hinder the formation of complexes where very bulky groups such as the t-butyl group are situated on the ring directly adjacent to the carbon atom with the phosphite attachment. Bulky groups on both ortho positions are particularly and obviously to be avoided. Otherwise the three aryloxy groups, alike or different, attached to phosphorus may comprise the full range of phenyl and alkylsubstituted phenyl groups of up to 18 carbon atoms.

As noted, the conditions of reaction as well as the proportions of reactants are not critical. Very large excess of triaryl phosphite should be avoided to avoid the competitive formation of the tetrakis-(triaryl phosphite) complex. For similar reasons, a considerable excess of the organonitrile should be present. It is preferred to use approximately three moles of triaryl phosphite and 3–100 moles of organonitrile for each mole of cobalt complex.

Application of hydrogen pressure should be made only after the ligand material is present in the reaction vessel in order to avoid some reduction of cobalt to the metallic state. A hydrogen pressure of around 50 psi is appropriate for the reduction. Excessive hydrogen pressure (over 1,000 psi) may lead to higher hydrides and the replacement of some ligands in the complexes.

The presence of the new complexes is clearly indicated by the changes in the nmr and ir spectra which accompany their formation. As noted, the complexes are conveniently prepared in organic solvents, e.g., the organonitrile reactant, benzene, tetrahydrofuran, and may be used directly therein as homogeneous catalysts. Alternatively they may be isolated from solution as stable solids which can be characterized by conventional analysis and stored, out of contact with air, for subsequent use.

The special utility of these phosphite complexes as hydrogenation catalysts can be seen from their activity in hydrogenating 1-butene without the concomitant isomerization which interferes when phosphine complexes known to the art are used. The procedure and results typifying catalytic hydrogenation are shown below.

HYDROGENATION PROCEDURE

The hydrogenation/isomerization of 1-butene, is conducted in a Pyrex pressure bottle. Pressure bottle reactions are run in the laboratory in standard 12 oz Pyrex pressure bottles of 350 ml capacity. The Pyrex bottle is fitted with a stainless steel head, secured by a collar and sealed with a Viton O-ring, which contains a sample port sealed with a silicone rubber serum cap and an outlet, via a ⅛ inch stainless steel jumper tube and a Hoke valve, to a stainless steel bottle of 470 ml capacity. The stainless steel bottle is fitted with three inlets, via Hoke valves, for two gases and vacuum and with a vacuum-pressure gauge, 30 in. Hg. vacuum to 60 psig pressure, which is equipped with a 60 psig rupture disc. With this arrangement, it is possible to set up a reaction in an inert atmosphere, to meter in (by pressure drop) known quantities of gases, and to remove liquid or gas samples for glc analysis during reaction. Reaction mixtures are stirred magnetically, and temperature is controlled by immersing the Pyrex bottle in an oil bath at the appropriate temperature.

The catalyst to be tested is placed in the pressure bottle in a nitrogen-filled glove box. After attachment of the Pyrex bottle to the manifold, 10 ml of deaerated solvent is added in a stream of nitrogen and the system is evacuated. The Pyrex bottle is then pressured with 1-butene and finally with hydrogen. Pressure in the system is monitored as evidence of reaction, and, periodically, gas samples are removed for glc analysis. Glc analysis is performed on a 6' silicone gum nitrile column at room temperature. Under these conditions, butane, 1-butene, trans-2-butene and cis-2-butene are eluted in that order, with the first two components cleanly separated from each other and from the last two components which are not entirely resolved. The results are shown in the table below in terms of the relative peak heights found by glc analysis for the product gas after 2 hours of reaction at 25°C.

Table 1

Hydrogenation with $HCoL_3L'$ Complexes

| Complex* | | | | Product** | | | |
|---|---|---|---|---|---|---|---|
| Sample | Amt (g) | L | L' | butane | 1-butene | trans 2-butene | cis 2-butene |
| 1 | 0.09 | $PR'_3$ | $N_2$ | 82 | 67 | 12 | 37 |
| 2 | 0.09 | $PR'_3$ | $CH_3CN$ | 45 | 50 | 15 | 15 |
| 3 | 0.10 | $P(OR')_3$ | $CH_3CN$ | 95 | 71 | — | — |
| 4 | 0.12 | $P(OR'')_3$ | $CH_3CN$ | 22 | 95 | 2 | trace |
| 5 | 0.13 | $P(OR''')_3$ | $CH_3CN$ | 61 | 95 | — | — |

*R' = phenyl, R'' = o-tolyl, R''' = o-isopropylphenyl
**glc peak ht. after 2 hrs at 25°C, 25 psi $H_2$.

It is apparent that the phosphine complexes previously known to the art (samples 1 and 2), while catalytically active for hydrogenation, also produce a large amount of unwanted isomerization.

EMBODIMENTS OF THE INVENTION

The preparation of these hydridoorganonitriletris(-triaryl phosphite)cobalt complexes of the invention will be clear from the examples which follow.

EXAMPLE I

Hydridoacetonitriletris(triphenyl phosphite)cobalt

A solution of 1.34 g of triphenylphosphite in 8 ml of acetonitrile was combined with a solution of 0.40 g of $Co(C_8H_{12})(C_8H_{13})$ in 2 ml of tetrahydrofuran in a pressure bottle. The bottle was evacuated and filled with 50 psig hydrogen. Within four minutes at room temperature most of the initial red color had disappeared and yellow solid had formed. The bottle was left under 50 psig hydrogen pressure at 0°C for 15 minutes before venting the hydrogen. The solid was collected, washed with acetonitrile and dried, yield 1.1 g of yellow powder; mp (evac. cap.) ca 145°C (dec.) 220 MHz nmr of $C_6D_6$-TMS solution: quartet (J 53), 22.1 ppm upfield from TMS. 36.43 MHz$^{31}$P-nmr in benzene solution; one broad peak 144 ppm downfield from external 85% $H_3PO_4$. Infrared (Nujol) showed coordinated nitrile at 2280 $cm^{-1}$.

Anal. Calcd for $L_3CoHCH_3CN$, $C_{56}H_{49}NO_9P_3Co$: C, 65.10; H, 4.79; N, 1.35; P, 9.10; Co, 5.71 Found: C, 65.15; H, 4.78; N, 1.33; P, 9.30; Co, 5.68

This material could be recrystallized satisfactorily from benzene solution by adding acetonitrile.

A sample prepared in this manner catalysed hydrogenation of 1-butene as shown in Table 1, sample 3.

EXAMPLE II

Hydridoacetonitriletris(tri-o-tolyl phosphite)cobalt

A solution of 7.5 g of tri-o-tolyl phosphite in 40 ml of acetonitrile was prepared and 2.0 g of $Co(C_8H_{12})(C_8H_{13})$ was dissolved in this solution. After stirring under 50 psig hydrogen for 4.5 hours, the pressure was released and the solution was cooled to −35°C. The yellow solid was collected, washed with acetonitrile and dried (7.8 g). A 1.0 g sample was recrystallized from benzene-acetonitrile to give 0.87 g of yellow solid, mp (evac. cap.) 140°–145°C (dec).

220 MHz nmr in $C_6D_6$.TMS: quartet (J 55), 22.4 ppm upfield from TMS.

36.43 MHz$^{31}$P-nmr.in toluene: single broad peak 139 ppm downfield from external 85% $H_3PO_4$.

Infrared (Nujol): coordinated nitrile 2280 $cm^{-1}$.

Anal. Calcd for $C_{65}H_{67}O_9P_3NCo$: C, 67.41; H, 5.83; N, 1.20; P, 8.02; Co, 5.08 Found: C, 66.96; H, 5.84; N, 1.31; P, 8.22; Co, 5.12

A 0.12 g portion of this compound gave the catalytic hydrogenation results shown in Table 1, sample 4.

EXAMPLE III

Hydridoacetonitriletris[tris(o-isopropylphenyl)phosphite]cobalt

A solution of 1.5 g of $Co(C_8H_{12})(C_8H_{13})$ and 7.1 g of tri-o-isopropylphenyl phosphite in 40 ml of benzene was diluted with 5 ml of acetonitrile and stirred overnight at room temperature under 50 psig hydrogen. A 10 ml portion of the reaction mixture was diluted with 10 ml of acetonitrile and the resulting solution was concentrated to ca 2 ml under vacuum. Two liquid phases were present at this poiht. Alternate cooling and warming with intermittent scratching induced the formation of yellow solid. A second 10 ml portion of the reaction mixture was treated in the same way. The solids were combined, washed with acetonitrile and dried. The remainder of the original reaction mixture was treated similarly and this time crystals formed spontaneously as the volume was reduced. A small scale experiment showed that recrystallization from benzeneacetonitrile was feasible so the combined product, ca 6 g of yellow solid, was dissolved in 15 ml of benzene. Addition of 60 ml of acetonitrile to the filtered solution caused yellow solid to form. This was collected, washed with acetonitrile and vacuum dried, yield 4.0 g, mp ca 130°C (dec) (evac. cap.). This solid is apparently a crystalline benzene solvate since nmr spectra in cyclohexane and tetrahydrofuran solutions show the presence of approximately one mole of benzene.

220 MHz nmr in deuterobenzene now showed only one high field resonance, a quartet (J 57), 22.4 ppm. In deutero acetone there was a single high field peak also, a quartet (J 57), 22.8 ppm; in benzonitrile there was a quartet (J 57), 21.7 ppm.

60 MHz nmr in deuterobenzene showed aromatic protons, δ6.7 to 8.0, area 105; methine protons δ3.3, area 25; methyl protons δ1.0, doublet (J 7), area 160.

36.43 MHz$^{31}$P-nmr in benzene showed only one signal, a broad peak at 136 ppm downfield from external 85% $H_3PO_4$. Infrared (Nujol) showed coordinated acetonitrile at 2270 $cm^{-1}$.

Anal. Calcd for $C_{83}H_{103}O_9NP_3Co.C_6H_6$ C, 71.80; H, 7.38; N, 0.94; P, 6.24; Co, 3.95. Found: C, 71.75; H, 7.25; N, 1.01; P, 6.56; Co, 3.92.

Well formed crystalline material was obtained by crystallization from ether-acetonitrile; mp ca 130°C (dec) (evac. cap.). The 60 MHz nmr spectrum indicated that the solid was no longer a benzene solvate, but the ir spectrum (Nujol) now showed both free (2255 $cm^{-1}$) and coordinated acetonitrile (2270 $cm^{-1}$) evan after vacuum drying, and the elemental anaylsis (C, 69.73; H, 7.62; N, 2.15) also suggested that the crystals had acetonitrile in the lattice instead of benzene.

A 0.13 g sample of the solid benzene monosolvate isolated as described above was found to be an active hydrogenation catalyst as shown by the results for sample 5 in Table 1.

The embodiments of the invention in which an exclusive property of privilege is claimed are defined as follows:

1. A cobalt hydride complex of the formula $HCo[R(CN)_x][P(OAr)_3]_3$ wherein:

$x$ is 1 or 2;

when $x$ is 1, R is alkyl, alkenyl, aryl or alkaryl of up to 18 carbons;

when $x$ is 2, R is alkylene, alkenylene, arylene or alkarylene of up to 18 carbons, and the Ar's alike or different, are phenyl or alkylphenyl of up to 18 carbons.

2. A cobalt hydride complex of claim 1 named hydridoacetonitriletris(triphenyl phosphite)cobalt.

3. A cobalt hydride complex of claim 1 named hydridoacetonitriletris(tris-o-tolyl phosphite)cobalt.

4. A cobalt hydride complex of claim 1 named hydridoacetonitriletris[tris(o-isopropylphenyl)phosphite]cobalt.

5. The process of forming a complex of claim 1 wherein π-cyclooctenyl-π-cycloocta-1,5-diene cobalt is reduced with hydrogen in liquid solution in the presence of a stoichiometric excess of an organonitrile of the formula $R(CN)_x$ and a triaryl phosphite of the formula $P(OAr)_3$, R, $x$ and Ar being as in claim 1.

6. The process of claim 5 wherein the organonitrile is acetonitrile and the triaryl phosphite is triphenyl phosphite.

7. The process of claim 5 wherein the organonitrile is acetonitrile and the triaryl phosphite is tri-o-tolyl phosphite.

8. The process of claim 5 wherein the organonitrile is acetonitrile and the triaryl phosphite is tri-o-isopropylphenyl phosphite.

* * * * *